United States Patent
Enevoldsen et al.

(10) Patent No.: US 8,100,661 B2
(45) Date of Patent: Jan. 24, 2012

(54) WIND TURBINE ROTOR BLADE AND WIND TURBINE ROTOR

(75) Inventors: Peder Bay Enevoldsen, Vejle (DK); Søren Hjort, Brande (DK); Rune Rubak, Silkeborg (DK)

(73) Assignee: Siemens Aktiengesellschaft, Munich (DE)

( * ) Notice: Subject to any disclaimer, the term of this patent is extended or adjusted under 35 U.S.C. 154(b) by 767 days.

(21) Appl. No.: 12/218,481

(22) Filed: Jul. 15, 2008

(65) Prior Publication Data

US 2009/0022598 A1 Jan. 22, 2009

(30) Foreign Application Priority Data

Jul. 20, 2007 (EP) .................................. 07014328

(51) Int. Cl.
*B63H 1/26* (2006.01)
*B63H 7/02* (2006.01)
*B64C 11/16* (2006.01)
*B64C 27/46* (2006.01)
*F01D 5/14* (2006.01)
*F03B 7/00* (2006.01)
*F03D 11/02* (2006.01)
*F04D 29/38* (2006.01)

(52) U.S. Cl. .................. 416/228; 416/223 R; 416/238; 416/248

(58) Field of Classification Search .................. 416/228, 416/238, 248, DIG. 5, 223 R
See application file for complete search history.

(56) References Cited

U.S. PATENT DOCUMENTS

| 4,522,564 A | 6/1985 | Carter, Jr. et al. | |
| 2006/0018759 A1* | 1/2006 | Moser | 416/223 R |
| 2007/0041829 A1 | 2/2007 | Bonnet | |
| 2008/0317600 A1* | 12/2008 | Enevoldsen et al. | 416/223 R |
| 2009/0180889 A1* | 7/2009 | Stiesdal | 416/223 R |
| 2009/0257882 A1* | 10/2009 | Olsen | 416/241 B |

FOREIGN PATENT DOCUMENTS

| CN | 1745245 A | 3/2006 |
| DE | 19963086 C1 | 6/2001 |
| DE | 20301445 U1 | 7/2004 |
| EP | 0102657 A1 | 3/1984 |
| WO | WO 00/06898 A1 | 2/2000 |
| WO | WO 02/084114 A1 | 10/2002 |
| WO | 2007147177 A2 | 12/2007 |

OTHER PUBLICATIONS

Hau: "5.5 Ausgeführte Rotorblattformen", Windkraftanlagen-Grundlagen, Technik, Einsatz, Widschaftlichkeit, Springer Verlag Berlin, Jan. 1, 1996, pp. 113-118, XP-002174275.
Communication from Chinese Patent Office in English and Chinese, Oct. 14, 2011, pp. 1-6.

* cited by examiner

*Primary Examiner* — Michelle Estrada

(57) ABSTRACT

A wind turbine rotor blade is provided which includes a root end and a tip end located opposite the root end. A leading edge extends from the root end to the tip end. A trailing edge extends from the root end to the tip end. A span direction is defined by a line extending linearly from the root end to the tip end. A chord direction is perpendicular to the span direction and lies in the plane extending through the leading edge and the trailing edge. A shoulder is the point of the maximum chord-wise extension. An airfoil portion extends from the shoulder to the tip end. The airfoil portion comprises a span-wise interval begging before the tip end and extending to or close to the tip end and in which the distribution of the chord-wise extension is increased as compared to the load optimised distribution of the chord-wise extension.

14 Claims, 3 Drawing Sheets

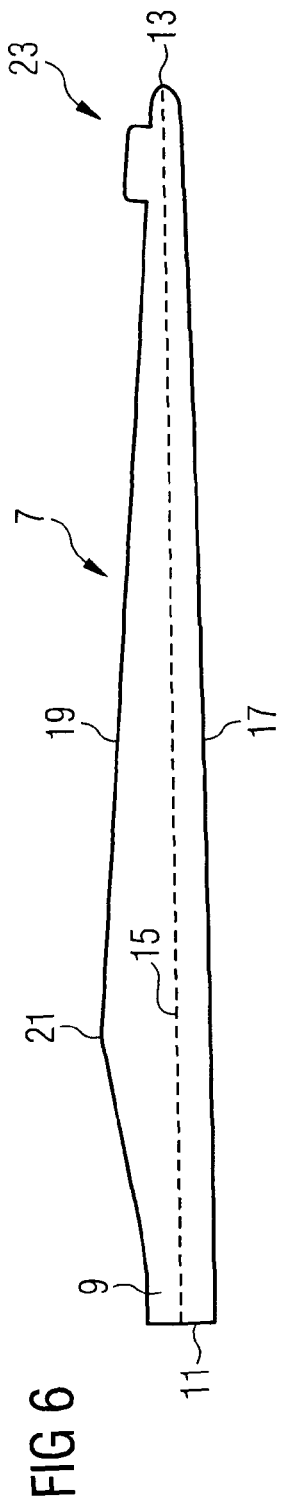
FIG 6
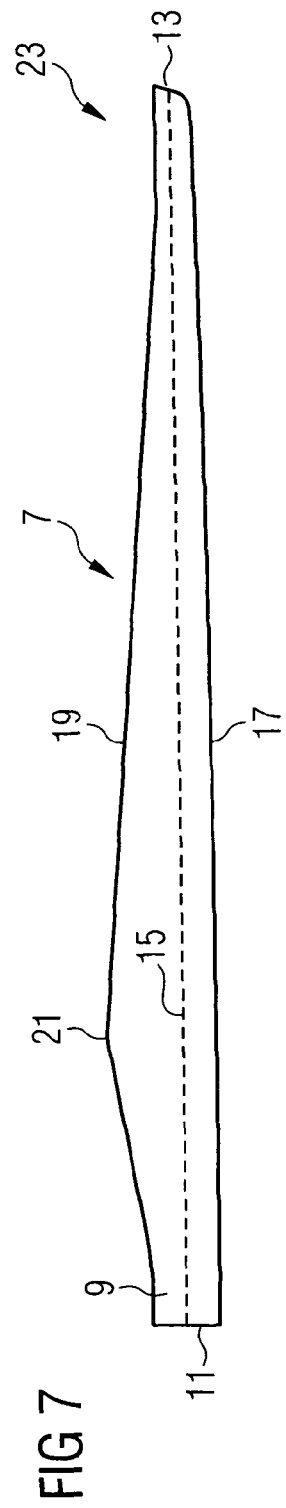
FIG 7
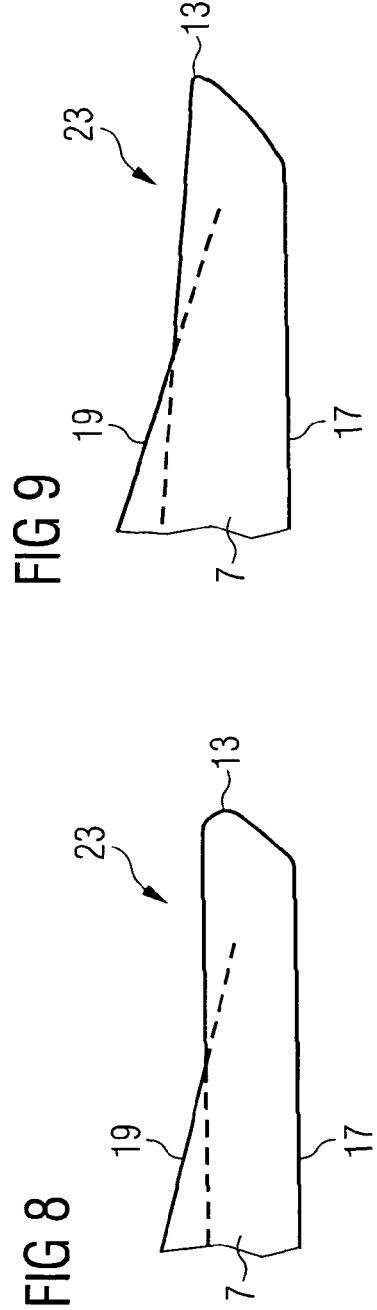
FIG 8
FIG 9

WIND TURBINE ROTOR BLADE AND WIND TURBINE ROTOR

CROSS REFERENCE TO RELATED APPLICATIONS

This application claims priority of European Patent Office application No. 07014328.4 EP filed Jul. 20, 2007, which is incorporated by reference herein in its entirety.

FIELD OF INVENTION

The present invention relates to a wind turbine rotor blade. In addition, the present invention relates to a wind turbine rotor comprising a rotor hub and a wind turbine rotor blade.

SUMMARY OF INVENTION

In today's wind turbine rotor blades one aims to minimise the loads acting on the inner part of the blade and on the turbine itself. In order to reduce such loads the outer part of the blades become rather slender in modern plan form designs of rotor blades so that the loads which are generated at the outer part of the blade are relatively low. Furthermore, in order to damp load generating oscillations in the blade it is known to provide damping means near the blade's tip, for example, in the form of liquid sloshing dampers. Such liquid sloshing dampers are, for example, disclosed in WO 00/06898 A1 or WO 02/084114 A1. Mechanical damping means are, for example, disclosed in US 2007/0041829 A1. If no damping means is used material is usually added to the blade to reduce the adverse effects of the load generating vibrations by increasing its load bearing capability.

With respect to the state of the art it is an objective of the present invention to provide an improved wind turbine rotor blade and an improved wind turbine rotor.

This objective is solved by a wind turbine rotor blade and a wind turbine rotor according to the independent claims. The depending claims contain further developments of the invention.

An inventive wind turbine rotor blade comprises a root end by which it can be fixed to a rotor hub, a tip end located opposite to the root end, a leading edge extending from the root end to the tip end and a trailing edge extending from the root end to the tip end. A span direction is defined by a line extending linearly from the root end to the tip end and a chord direction is defined as being the direction which is perpendicular to the span direction and which lies in the plane extending through the leading edge and the trailing edge. The blade further comprises a shoulder which is defined as the point of maximum chord-wise extension and an airfoil portion extending from the shoulder to the tip end and having a load optimised distribution of its chord-wise extension over a substantial part of its span-wise extension in which the chord-wise extension decreases from the shoulder towards the tip end. The inventive wind turbine rotor blade further comprises an airfoil portion with a span-wise interval which begins before the tip end and extends to or close to the tip end. In said interval the chord-wise extension of the airfoil portion departs from the load optimised distribution such that the chord length is increased as compared to the load optimised distribution of the chord-wise extension. In particular, the chord-wise extension of the airfoil portion may be constant in at least a part of said span-wise interval or may even increase towards the tip end in at least a part of the span-wise interval.

Increasing the chord length of the blade in the interval as compared to the load optimised distribution of the chord-wise extension alters the aerodynamics at or close to the tip of the blade so as to provide aerodynamic damping in the blade's tip region. As a consequence, load generating oscillations are damped without the use of damping means inside the blade. Also, additional material to strengthen the blade in order to increase its load bearing capability is not necessary with the inventive blade.

The invention is based on the following observations:

As has already been mentioned in the introductory part, in load optimising plan form designs of modern wind turbines the outer part of the blade is often very slender in order to reduce the loads acting on the inner blade and the turbine itself. However, for such a design the contribution to the aerodynamic damping from the outer part of the blade is reduced. Reduced aerodynamic damping in the outer part of the blade, however, leads to higher structural loads. As a consequence, a load optimised blade plan form having low chord width at the outer part of the blade does often not yield the desired load reduction as vibrations induced by operating in turbulent wind fields are not sufficiently aerodynamically damped by the outer part of the blade and thus tend to persist, and in some cases tend to get worse over time.

In contrast to the state of the art solutions, i.e. introducing damping means into the blade, the present invention improves the aerodynamic damping by altering the blade's plan form design in the tip region. Although the larger chord length in the tip region of the inventive rotor blade will lead to moderately higher static loads on this part of the blade the increased aerodynamic damping in said interval will affect the entire blade, and the moderate increase in static loading in said interval will be more than offset by the increased aerodynamic damping. The overall result is that the dynamic loads on the blade while operating in a turbulent wind field will be reduced.

Outside said tip region the wind turbine rotor blade may have a distribution of chord length which is load optimised, i.e. the blade has a load optimised plan form outside said tip region.

Advantageously the span-wise interval does not begin before 80% of the span-wise extension of the rotor blade as measured from the root end. Preferably it does not begin before 90% of the span-wise extension. In other words, said interval represents only a minor part of the airfoil portion's span-wise extension. By this measure the aerodynamic damping effect can be achieved without increasing the static loads acting on the blade more than necessary.

When said span-wise interval extends close to the tip end the chord-wise extension of the airfoil portion between said interval and the tip end may be distributed according to the load optimised distribution of the chord-wise extension.

If said span-wise interval does not extend to the tip end it advantageously extends to at least 95% of the span-wise extension of the rotor blade as measured from the root end.

An inventive wind turbine rotor comprises a rotor hub and an inventive wind turbine rotor blade. The rotor may have any number of rotor blades, i.e. at least one. In particular it may have three blades as is usual in modern wind turbines.

BRIEF DESCRIPTION OF THE DRAWINGS

Further features, properties and advantages of the present invention will become clear from the following description of embodiments of the invention in conjunction with the accompanying drawings.

FIG. 6 shows a fourth embodiment of the inventive wind turbine rotor blade.

FIG. 7 shows a fifth embodiment of the inventive wind turbine rotor blade.

FIG. 8 shows detail of the rotor blade shown in FIG. 7.

FIG. 9 shows a sixth embodiment of the inventive wind turbine rotor blade.

DETAILED DESCRIPTION OF INVENTION

Figure 1:
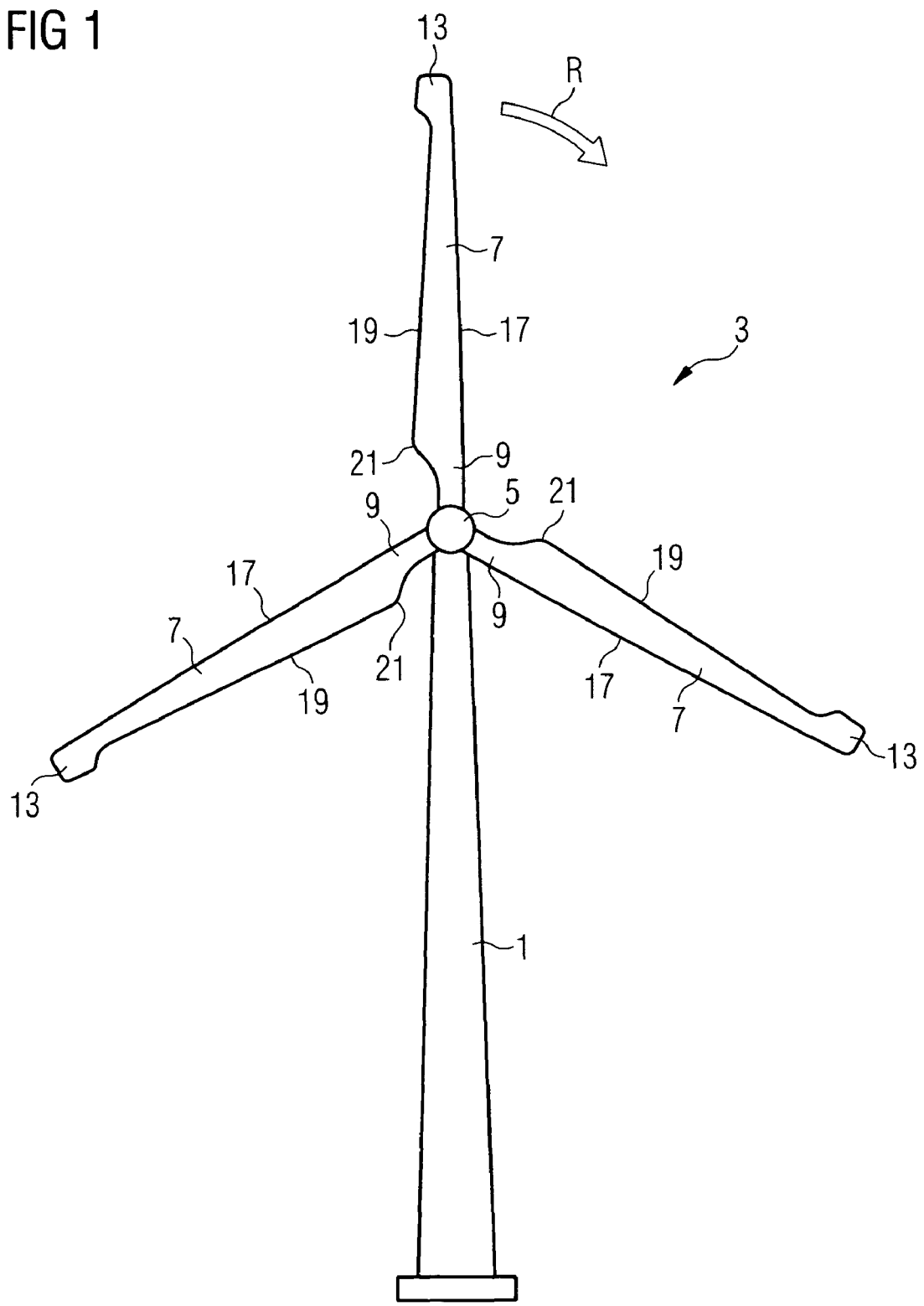
FIG. 1 shows a wind turbine.

A wind turbine with an inventive rotor is shown in FIG. 1. The wind turbine comprises a tower 1 and a rotor 3 located at the top of the tower 1. The rotor 3 comprises a rotor hub 5 which is fixed to a nacelle (not visible in the figure) which is located at the top of the tower 1 and houses the electrical generator of the wind turbine. Three rotor blades 7 extend radially outwards from the rotor hub 5. Note that the number of rotor blades may be less than or more than three depending on the design of the wind turbine. However, two-bladed rotors and, in particular, three bladed rotors are the most common designs in modern wind turbines.

Each rotor blade 7 comprises a root section 9 with a root end 11 by which it is fixed to the rotor hub 5. The root end 11 is best seen in FIGS. 3 to 7 which show various embodiments of the rotor blade 7. Each rotor blade 7 further comprises a tip end 13 which is the radially outermost part of the blade. The leading edge in rotation direction R (see FIG. 1) is the upwind edge 17 while the opposite edge, or trailing edge, is the downwind edge 19.

A notional line 15 extending from the centre of the root end 11 to the tip 13 represents the radial direction of the rotor and is called "span" 15. The extension of the rotor blade from the leading edge 17 to the trailing edge 19 in a direction perpendicular to the span 15 is call "chord". A plan form of a rotor blade can be characterised by a chord distribution along the span 15, i.e. by defining a chord length at each point of the span. The location of the maximum chord length in such a chord distribution is called "shoulder" and indicated by reference numeral 21.

An airfoil portion of the blade extends from the shoulder 21 to the tip end 13.

Figure 2:
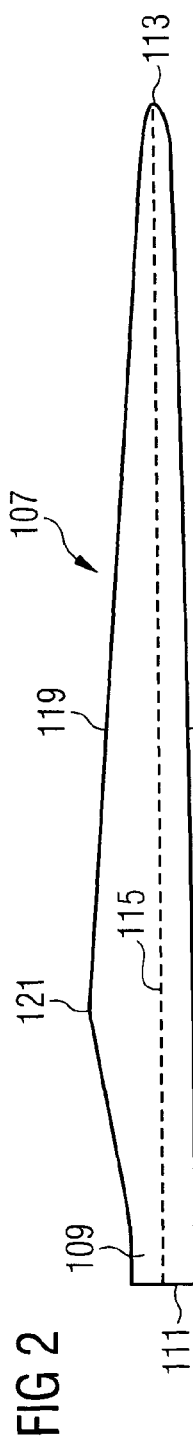
FIG. 2 shows a state of the art wind turbine rotor blade.

In a state of the art rotor blade 107, as shown in FIG. 2, the chord distribution, i.e. the distribution of its chord-wise extension, along the span 115 is such that the chord length continuously decreases from the shoulder 121 towards the tip 113 so as to produce a load optimised plan form of the rotor blade. Note that the reference numerals with respect to the features of the state of the art blade 107 are increased by 100 as compared to the reference numerals of the inventive blades.

In contrast to the state of the art blade, the distribution of the chord-wise extension of the inventive rotor blade departs from the load optimised distribution in a span-wise interval 23 of the airfoil portion such that the chord-length in this interval 23 is increased as compared to the load optimised distribution of the chord-wise extension. This interval 23 is located close to the tip, i.e. between 80% of the blade's span-wise extension as measured from the root end 11 and the tip end 13, and, preferably, between 90% of the blade's span-wise extension and the tip end 13. While in some embodiments this interval extends up to the tip end 13 in other embodiments the interval does not entirely extend to the tip end 13. However, preferably, the interval extends to at least 95% of the span-wise extension of the rotor blade as measured from the root end 11.

Various embodiments of the inventive rotor blade will now be described with respect to FIGS. 3 to 9.

Figure 3:
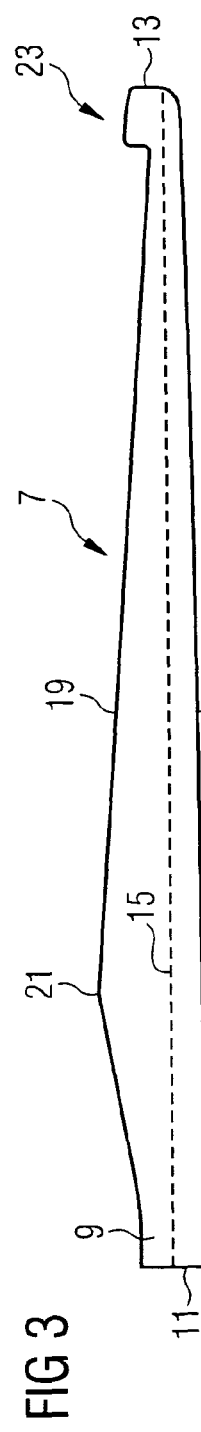
FIG. 3 shows a first embodiment of the inventive wind turbine rotor blade.

FIG. 3 shows a first embodiment of an inventive rotor blade 7 in which the interval 23 extends from about 95% of the span-wise extension of the blade 7 completely to the tip end 13 and in which the chord's distribution is characterised by a 100% increase of the chord length as compared to the load optimised plan form, i.e. as compared to the chord distribution which would arise if the chord distribution outside of the interval was continued to the tip end 13. By this measure, the aerodynamic effective area near the tip end 13 increases which leads to an increased damping of vibrations in the blade 7.

Figure 4:
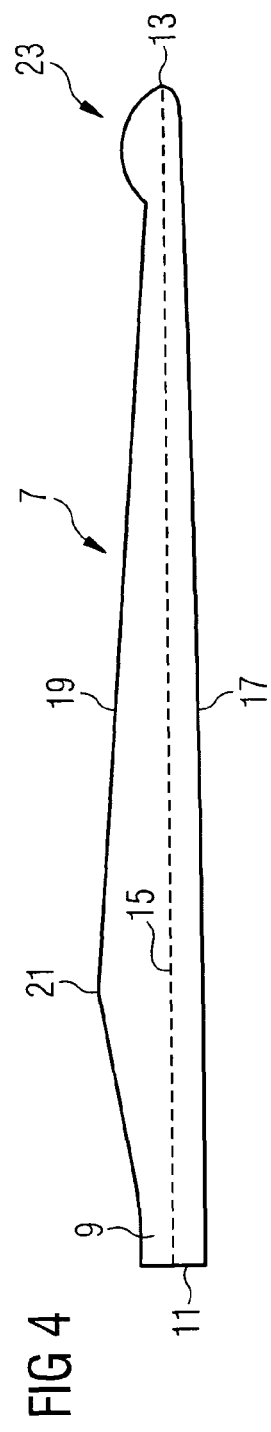
FIG. 4 shows a second embodiment of the inventive wind turbine rotor blade.

A second embodiment of the inventive wind turbine rotor blade 7 is shown in FIG. 4. In this embodiment the interval 23 extends over 10% of the blade's span-wise length, namely from 90% of the span-wise extension of the blade 7 to the tip end 13, i.e. 100% of the span-wise extension. The distribution of the chord-wise extension in the interval 23 is arc-like, i.e. increasing at the beginning of the interval and decreasing at the end of the interval 23. An increase of the aerodynamic effective area of the blade 7 near the tip end 13 is the result. Like in the first embodiment, the increased area leads to increased aerodynamic damping of vibrations in the rotor blade 7.

Figure 5:
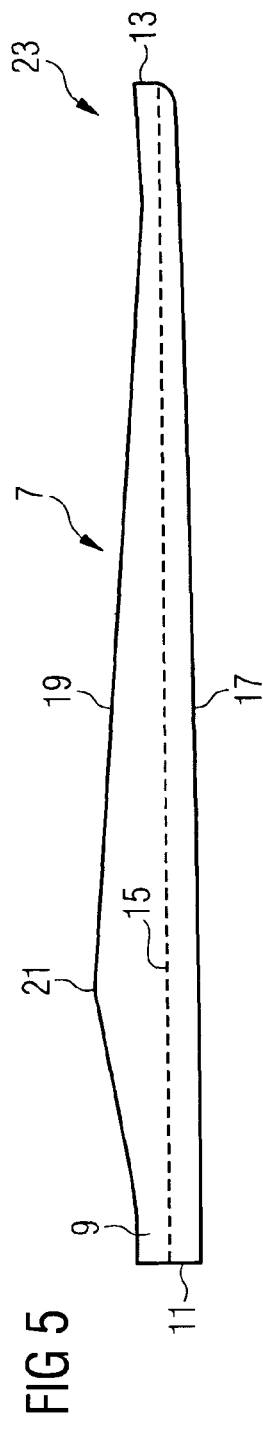
FIG. 5 shows a third embodiment of the inventive wind turbine rotor blade.

A third embodiment of the inventive rotor blade 7 is shown in FIG. 5. Like in the second embodiment, the interval 23 extends from 90% of the span-wise extension of the blade 7 to 100% of the span-wise extension, i.e. to the tip end 13. In the interval 23 the distribution of the chord-wise extension is chosen such that the chord length increases again towards the tip end 13. This increase also increases the aerodynamic effective area compared to a load optimised chord distribution but to a lesser degree than in the second embodiment. However, the slight increase, shown in FIG. 5, increases the aerodynamic effective area close to the tip end 13 and hence leads to an increased aerodynamic damping of vibrations in the wind turbine rotor blade 7. However, since the departure from the load optimised plan form is less pronounced than in the second embodiment the static loads induced by this departure is also less than in the second embodiment.

A fourth embodiment of the inventive wind turbine rotor blade 7 is shown in FIG. 6. In this embodiment, the interval 23 extends from 90% to 95% of the blade's span-wise extension. The distribution of the chord-wise extension in the interval 23 is chosen such that the chord length is increased by 50% as compared to the load optimised chord distribution. Between the end of the interval and the tip end 13 of the rotor blade 7 the chord distribution is again the chord distribution of the load optimised plan form.

A fifth embodiment of the inventive wind turbine rotor blade 7 is shown in FIG. 7. In this embodiment the interval 23 extends from 95% of the span-wise extension of the rotor blade 7 to 100% of its span-wise extension, i.e. to the tip end 13. In the interval the distribution of chord-wise extension is such that the chord length of the blade 7 is constant throughout the interval, except possibly for the very tip end of the blade. An enlarged section of the interval 23 and the tip end 13 of this embodiment is shown in FIG. 8. Note that the reduction of chord length before the interval 23 is exaggerated in FIG. 8 for clarity purposes.

A sixth embodiment of the inventive wind turbine rotor blade 7 is shown in FIG. 9. This embodiment is very similar to the embodiment of FIG. 7 and differs from this embodiment only in that the distribution of the chord-wise extension is not constant throughout the interval but decreases slightly towards the tip end 13. However, the decrease is less than the decrease of chord length before the interval 23, i.e. less than in a load optimised plan form. As in FIG. 8, the decrease of chord length outside the interval 23 is exaggerated for clarity purposes. The embodiment shown in FIG. 9 is the embodiment with the least increase in static loads due to departing from the load optimised plan form of all embodiments shown.

With reference to the embodiments a number of inventive wind turbine blades have been described with different degrees of increased damping and increased static loads. The plan form which will actually be used for an individual wind turbine may depend on various circumstances, for example, the expected degree of turbulence at the wind turbine's location or the diameter of the rotor. Generally, the chosen plan form will be a trade off between locally increased static loads and globally increased damping and thereby globally reduced dynamic loading of the rotor.

Although the described embodiments differ markedly from each other, all embodiments have in common that the chord-wise extension of the blade in the interval 23 is increased relative to the chord-wise extension that would have been the result of a smooth extension, linear or nonlinear, of the leading and trailing edges in the airfoil portion outside said interval, i.e. relative to a load optimised plan form of the state of the art blade 107 shown in FIG. 2.

The invention claimed is:

1. A wind turbine rotor blade, comprising:
a root end by which the blade can be fixed to a rotor hub;
a tip end located opposite the root end;
a leading edge extending from the root end to the tip end;
a trailing edge extending from the root end to the tip end;
a span direction defined by a line extending linearly from the root end to the tip end;
a chord direction perpendicular to the span direction and which lies in the plane extending through the leading edge and the trailing edge;
a shoulder defined as the point of a maximum chord-wise extension; and
an airfoil portion extending from the shoulder to the tip end,
wherein the airfoil portion comprises a span-wise interval beginning before the tip end and extending to or close to the tip end and in which the distribution of the chord-wise extension is increased as compared to the load optimised distribution of the chord-wise extension,
wherein the span-wise interval begins at or after 80% of the span-wise extension of the rotor blade as measured from the root end,
wherein the distribution of the chord-wise extension of the airfoil portion is constant in at least a part of said span-wise interval, and
wherein the cord-wise extension of the airfoil provides aerodynamic damping.

2. The wind turbine rotor blade as claimed in claim 1, wherein the span-wise interval begins at or after 90% of the span-wise extension of the rotor blade as measured from the root end.

3. The wind turbine rotor blade as claimed in claim 1, wherein the distribution of the chord-wise extension of the airfoil portion increases towards the tip end in at least a part of said span-wise interval.

4. The wind turbine rotor blade as claimed in claim 1,
wherein the span-wise interval extends close to the tip end, and
wherein the chord-wise extension of the airfoil portion between the interval and the tip end is distributed according to the load optimised distribution of the chord-wise extension.

5. The wind turbine rotor blade as claimed in claim 4, wherein the interval extends to at least 95% of the span-wise extension of the rotor blade as measured from the root end.

6. A wind turbine rotor comprising:
a rotor hub; and
a wind turbine rotor blade fixed to the rotor hub as claimed in claim 1.

7. The wind turbine rotor as claimed in claim 6, wherein the span-wise interval begins at or after 90% of the span-wise extension of the rotor blade as measured from the root end.

8. The wind turbine rotor as claimed in claim 6, wherein the distribution of the chord-wise extension of the airfoil portion increases towards the tip end in at least a part of said span-wise interval.

9. The wind turbine rotor as claimed in claim 6,
wherein the span-wise interval extends close to the tip end, and
wherein the chord-wise extension of the airfoil portion between the interval and the tip end is distributed according to the load optimised distribution of the chord-wise extension.

10. The wind turbine rotor as claimed in claim 9, wherein the interval extends to at least 95% of the span-wise extension of the rotor blade as measured from the root end.

11. The wind turbine rotor as claimed in claim 6,
wherein the chord-wise extension is only extended in a direction of the trailing edge.

12. The wind turbine rotor as claimed in claim 6, wherein the chord-wise extension extends to the tip end.

13. The wind turbine rotor blade as claimed in claim 1, wherein the chord-wise extension is only extended in a direction of the trailing edge.

14. The wind turbine rotor blade as claimed in claim 1, wherein the chord-wise extension extends to the tip end.

* * * * *